United States Patent
Yamashita

(10) Patent No.: US 11,932,182 B2
(45) Date of Patent: Mar. 19, 2024

(54) CONTROL DEVICE, CONTROL METHOD, AND COMPUTER PROGRAM

(71) Applicant: SUMITOMO ELECTRIC INDUSTRIES, LTD., Osaka (JP)

(72) Inventor: Tetsuo Yamashita, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 786 days.

(21) Appl. No.: 17/042,260

(22) PCT Filed: Jan. 23, 2019

(86) PCT No.: PCT/JP2019/002107
§ 371 (c)(1),
(2) Date: Sep. 28, 2020

(87) PCT Pub. No.: WO2019/202798
PCT Pub. Date: Oct. 24, 2019

(65) Prior Publication Data
US 2021/0046887 A1    Feb. 18, 2021

(30) Foreign Application Priority Data

Apr. 19, 2018    (JP) ................. 2018-080752

(51) Int. Cl.
*B60R 16/023*    (2006.01)
*B60R 16/033*    (2006.01)
(Continued)

(52) U.S. Cl.
CPC ........ *B60R 16/0231* (2013.01); *B60R 16/033* (2013.01); *B60W 50/00* (2013.01);
(Continued)

(58) Field of Classification Search
CPC .. B60R 16/0231; B60R 16/033; B60W 50/00; B60W 2050/0083; B60W 2556/45;
(Continued)

(56) References Cited

U.S. PATENT DOCUMENTS

| | | |
|---|---|---|
| 2009/0277701 A1 | 11/2009 | Soma et al. |
| 2015/0113521 A1 | 4/2015 | Suzuki et al. |
| 2018/0018160 A1* | 1/2018 | Teraoka .................... G06F 8/65 |

FOREIGN PATENT DOCUMENTS

| | | |
|---|---|---|
| JP | S61-191201 A | 8/1986 |
| JP | 2007-235527 A | 9/2007 |

(Continued)

*Primary Examiner* — Shon G Foley
(74) *Attorney, Agent, or Firm* — Oliff PLC

(57) ABSTRACT

A control device includes: an in-vehicle communication unit capable of communicating with an on-vehicle control device; and a control unit configured to control the in-vehicle communication unit. The control unit monitors a power storage amount of an on-vehicle battery during traveling, and executes a charge control for causing the in-vehicle communication unit to transmit an instruction of power generation to an on-vehicle generator that supplies power to the on-vehicle battery, when the power storage amount is reduced to reach a threshold value. The threshold value corresponds to a power amount greater than a necessary power amount required for an update process of a control program in the on-vehicle control device.

11 Claims, 7 Drawing Sheets

(51) Int. Cl.
*B60W 50/00* (2006.01)
*H02J 7/00* (2006.01)

(52) U.S. Cl.
CPC .... *H02J 7/0047* (2013.01); *B60W 2050/0083* (2013.01); *B60W 2556/45* (2020.02)

(58) Field of Classification Search
CPC ... B60W 2050/0075; B60W 2710/244; B60W 10/24; B60W 50/0097; B60W 50/0098; H02J 7/0047; H02J 7/0048; H02J 7/1438; H02J 7/16; H02J 7/1423; H02J 2310/48; Y02T 10/62; Y02T 10/70; Y02T 10/7072; Y02T 90/14; B60L 50/40; B60L 50/50; B60L 53/00; B60L 55/00; B60L 58/00
See application file for complete search history.

(56) References Cited

FOREIGN PATENT DOCUMENTS

| | | |
|---|---|---|
| JP | 2008-087516 A | 4/2008 |
| JP | 2010-288345 A | 12/2010 |
| JP | 2011-121396 A | 6/2011 |
| JP | 2011-178384 A | 9/2011 |
| JP | 2013-242200 A | 12/2013 |
| JP | 2014-200123 A | 10/2014 |
| JP | 2015-079468 A | 4/2015 |

* cited by examiner

CONTROL DEVICE, CONTROL METHOD, AND COMPUTER PROGRAM

TECHNICAL FIELD

The present invention relates to a control device, a control method, and a computer program. This application claims priority on Japanese Patent Application No. 2018-080752 filed on Apr. 19, 2018, the entire content of which is incorporated herein by reference.

BACKGROUND ART

Various methods for improving fuel efficiency of a vehicle by charging and discharging a battery within a certain voltage range while suppressing deterioration of the battery during traveling of the vehicle, have been proposed. For example, Japanese Laid-Open Patent Publication No. 2014-200123 (hereinafter, PATENT LITERATURE 1) has proposed a method for improving fuel efficiency of a vehicle by charging and discharging a lead battery within a certain voltage range and simultaneously charging and discharging a power storage unit, connected in parallel to the lead battery, within a wider voltage range.

CITATION LIST

Patent Literature

PATENT LITERATURE 1: Japanese Laid-Open Patent Publication No. 2014-200123

SUMMARY OF INVENTION

A control device according to one aspect of the present disclosure includes: an in-vehicle communication unit capable of communicating with an on-vehicle control device; and a control unit configured to control the in-vehicle communication unit. The control unit monitors a power storage amount of an on-vehicle battery during traveling, and executes a charge control for causing the in-vehicle communication unit to transmit an instruction of power generation to an on-vehicle generator that supplies power to the on-vehicle battery, when the power storage amount is reduced to reach a threshold value. The threshold value corresponds to a power amount greater than a necessary power amount required for an update process of a control program in the on-vehicle control device.

A control method according to one aspect of the present disclosure is a method for controlling power generation of an on-vehicle generator. The method includes: setting, as a threshold value, a power amount greater than a necessary power amount required for an update process of a control program in an on-vehicle control device; monitoring a power storage amount of an on-vehicle battery during traveling, and when the power storage amount is reduced to reach the threshold value, instructing the on-vehicle generator, which supplies power to the on-vehicle battery, to generate power.

A computer program according to one aspect of the present disclosure is a program for causing a computer to function as a control device that controls power generation of an on-vehicle generator. The control device includes a communication unit capable of communicating with an on-vehicle control device. The computer program causes the computer to function as a control unit configured to monitor a power storage amount of an on-vehicle battery during traveling, and execute a charge control for causing the communication unit to transmit an instruction of power generation to an on-vehicle generator that supplies power to the on-vehicle battery, when the power storage amount is reduced to reach a threshold value. The threshold value corresponds to a power amount greater than a necessary power amount required for an update process of a control program in the on-vehicle control device.

The present disclosure can be implemented as a control device including such a characteristic control unit, a control method including such characteristic processes as steps, and a program for causing a computer to execute such steps. Also, the present disclosure can be implemented as a semiconductor integrated circuit having a function of executing some or all of the steps, or as a photovoltaic system including a photovoltaic apparatus.

DESCRIPTION OF EMBODIMENTS

Figure 1:
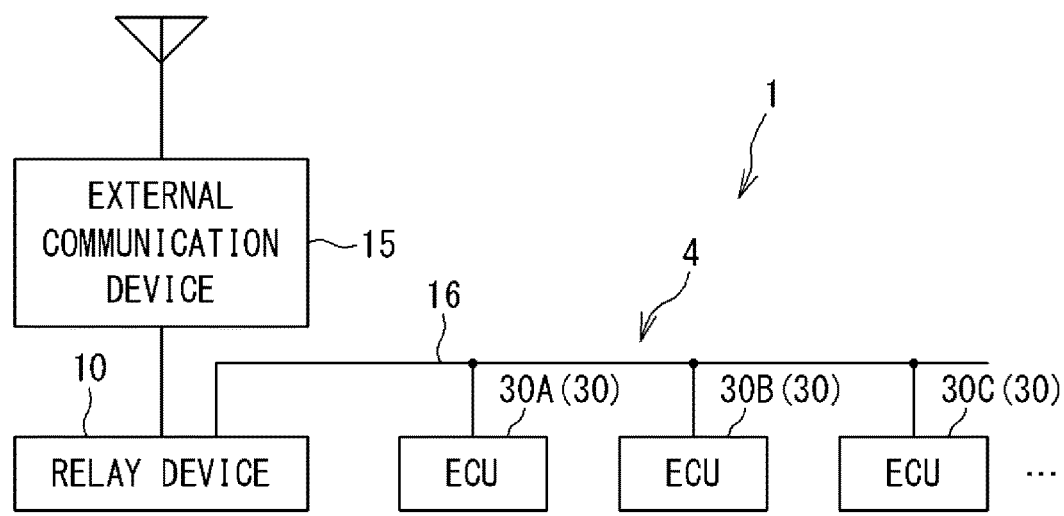
FIG. 1 shows a schematic diagram showing a configuration of a vehicle according to an embodiment.

Problems to be Solved by the Present Disclosure

In the automotive field in recent years, vehicles have become advanced in functionality, and a diverse range of devices are installed in vehicles. Accordingly, vehicles are equipped with large numbers of control devices, so-called ECUs (Electronic Control Units), for controlling these on-vehicle devices.

Examples of the ECUs include: traveling-related ECUs that control an engine, a brake, an EPS (Electric Power Steering), and the like in response to operations performed on an accelerator, the brake, and a steering wheel; body-related ECUs that control ON/OFF of interior lights and headlights, sound of an alarm unit, and the like in response to switch operations performed by an occupant; and meter-related ECUs that control operations of meters arranged near a driver's seat.

Generally, an ECU consists of an arithmetic processing unit such as a microcomputer, and implements control of a corresponding on-vehicle device by reading out a control program stored in an ROM (Read Only Memory) and executing the control program.

An old version of a control program of an ECU needs to be overwritten with a new version thereof in response to upgrading. In addition, data necessary for execution of the control program, such as map information and control parameters, also need to be overwritten.

A control program update process may be executed while a vehicle is stopped.

In this case, power required for the update process is supplied from a battery. Therefore, if the amount of power stored in the battery is insufficient while the vehicle is stopped, the update process cannot be completed. Therefore, not only improvement of fuel efficiency as disclosed in PATENT LITERATURE 1 but also the power storage amount of the battery during a stop of the vehicle needs to be considered while the vehicle is traveling.

Effects of the Present Disclosure

According to the present disclosure, the power storage amount of the battery during the stop of the vehicle can be set to a power amount equal to or greater than a necessary power amount required for the control program update process.

Outline of Embodiment of the Present Disclosure

Hereinafter, outlines of embodiments of the present disclosure are listed and described.

(1) A control device according to one aspect of the present disclosure includes: an in-vehicle communication unit capable of communicating with an on-vehicle control device; and a control unit configured to control the in-vehicle communication unit. The control unit monitors a power storage amount of an on-vehicle battery during traveling, and executes a charge control for causing the in-vehicle communication unit to transmit an instruction of power generation to an on-vehicle generator that supplies power to the on-vehicle battery, when the power storage amount is reduced to reach a threshold value. The threshold value corresponds to a power amount greater than a necessary power amount required for an update process of a control program in the on-vehicle control device. Since the charge control is executed by the control unit, power generation of the on-vehicle generator is controlled according to the instruction by the on-vehicle control device that controls the on-vehicle generator. Thus, the power storage amount of the on-vehicle battery during a stop of the vehicle can be set to a power amount equal to or greater than the necessary power amount. Therefore, the update process can be executed while the vehicle is stopped.

(2) In the control device according to the present embodiment, the control unit may calculate the threshold value, based on the necessary power amount. Thus, an appropriate threshold value according to the necessary power amount can be set as the threshold value that is used for control of power generation of the on-vehicle generator by the on-vehicle control device that controls the on-vehicle generator.

(3) In the control device according to the present embodiment, the control unit may calculate the threshold value by adding the necessary power amount to a lower-limit value of the power storage amount. Thus, the on-vehicle control device that controls the on-vehicle generator can be caused to control power generation of the on-vehicle generator such that the power storage amount of the on-vehicle battery during the stop of the vehicle is a sum of the necessary power amount and the lower-limit value of the power storage amount. Therefore, the update process can be executed while the vehicle is stopped.

(4) In the control device according to the present embodiment, the control unit may calculate the threshold value by adding the necessary power amount and a prescribed margin to the lower-limit value of the power storage amount. Thus, the on-vehicle control device that controls the on-vehicle generator can be caused to control power generation of the on-vehicle generator such that the power storage amount of the on-vehicle battery is a sum of the necessary power amount, the lower-limit value of the power storage amount, and the margin. Therefore, shortage of power is not likely to occur when the update process is executed while the vehicle is stopped.

(5) In the control device according to the present embodiment, the control unit may correct the calculated threshold value, based on an ambient temperature. Thus, the threshold value can be set in consideration of change in the ambient temperature.

(6) In the control device according to the present embodiment, the control unit may start the charge control at a position by a predetermined distance before a scheduled stop position in a direction opposite to an advancing direction of a vehicle. Thus, both reduction in fuel consumption and execution of the update process during the stop of the vehicle can be achieved.

(7) In the control device according to the present embodiment, the control unit may determine the predetermined distance, based on the necessary power amount. When the predetermined distance is a distance enough to allow storage of the necessary power amount, the period of the charge control can be shortened. The shortened period of the charge control realizes further reduction in fuel consumption.

(8) In the control device according to the present embodiment, the on-vehicle generator may generate power with rotation of an engine, and the control unit may cause the in-vehicle communication unit to transmit an instruction to change a rotation speed of the engine, based on a period from start of the charge control to stop of the vehicle, and on the necessary power amount. When the period from start of the charge control to stop of the vehicle is shorter than the period required for charging of the necessary power amount, the control unit can instruct an increase in the rotation speed of the engine. This instruction causes the on-vehicle control device, which controls driving of the engine, to execute a control to increase the rotation speed of the engine. Therefore, even when the period from start of the charge control to stop of the vehicle is short, the necessary power amount can be ensured in the on-vehicle battery during the stop of the vehicle.

(9) A control method according to the present embodiment is a method for controlling power generation of the on-vehicle generator in the control device according to any one of the above (1) to (8). This control method provides the same effects as those of the control device according to any one of the above (1) to (8).

(10) A computer program included in the present embodiment causes a computer to function as the control device according to any one of the above (1) to (8). This computer program provides the same effects as those of the control device according to any one of the above (1) to (8).

Details of Embodiments of the Present Disclosure

Hereinafter, embodiments of the present disclosure will be described with reference to the drawings. At least some parts of the embodiments described below can be combined together as desired. In the following description, the same reference numerals refer to the same components and constituent elements. The names and functions thereof are also the same. Therefore, repeated description thereof is not necessary.

First Embodiment

[Vehicle Configuration]

FIG. 1 is a schematic diagram showing a configuration of a vehicle according to a first embodiment.

With reference to FIG. 1, a vehicle 1 according to the present embodiment includes: an external communication device 15 for communicating with an external device; a plurality of ECUs (Electronic Control Units) 30A, 30B, 30C, . . . ; and a relay device 10 which is an ECU for relaying communications of the plurality of ECUs 30A, 30B, 30C, . . . with the external device. The plurality of ECUs 30A, 30B, 30C, . . . may be representatively referred to as "ECU 30".

The respective ECUs 30 are connected to each other by an in-vehicle communication line 16 terminating at the relay device 10, and form an in-vehicle communication network 4 together with the relay device 10. The communication network 4 is a bus-type communication network (e.g., CAN (Controller Area Network)) that allows the ECUs 30 to communicate with each other. In the network of this communication system, information is transmitted/received while being stored in a format called a data frame.

The communication network 4 may adopt not only CAN but also communication standards such as LIN (Local Interconnect Network), CANFD (CAN with Flexible Data Rate), Ethernet (registered trademark), and MOST (Media Oriented Systems Transport: MOST is a registered trademark).

Examples of the ECUs 30 may include: power train-related ECUs that control an engine, a brake, an EPS (Electric Power Steering), and the like in response to operations performed on an accelerator, the brake, and a steering wheel; body-related ECUs that control ON/OFF of interior lights and headlights, sound of an alarm unit, and the like in response to switch operations; and meter-related ECUs that control operations of meters arranged near a driver's seat.

The relay device 10 is further connected to the external communication device 15 via a communication line of a predetermined standard. Alternatively, the external communication device 15 may be mounted in the relay device 10. The external communication device 15 wirelessly communicates with the external device via a wide-area communication network such as the Internet. The external device is, for example, a server that stores therein the update program of the ECU 30. The external communication device 15 may have a plug (not shown), and may communicate, via a wire, with an external device connected to the plug. The external communication device 15 may be a device such as a mobile phone, a smart phone, a tablet terminal, or a notebook PC (Personal Computer) possessed by the user.

The relay device 10 relays information received from the external device by the external communication device 15, to the ECU 30. In addition, the relay device 10 relays information received from the ECU 30 to the external communication device 15. The external communication device 15 wirelessly transmits the relayed information to the external device.

[Power Supply Configuration of Vehicle]

Figure 2:
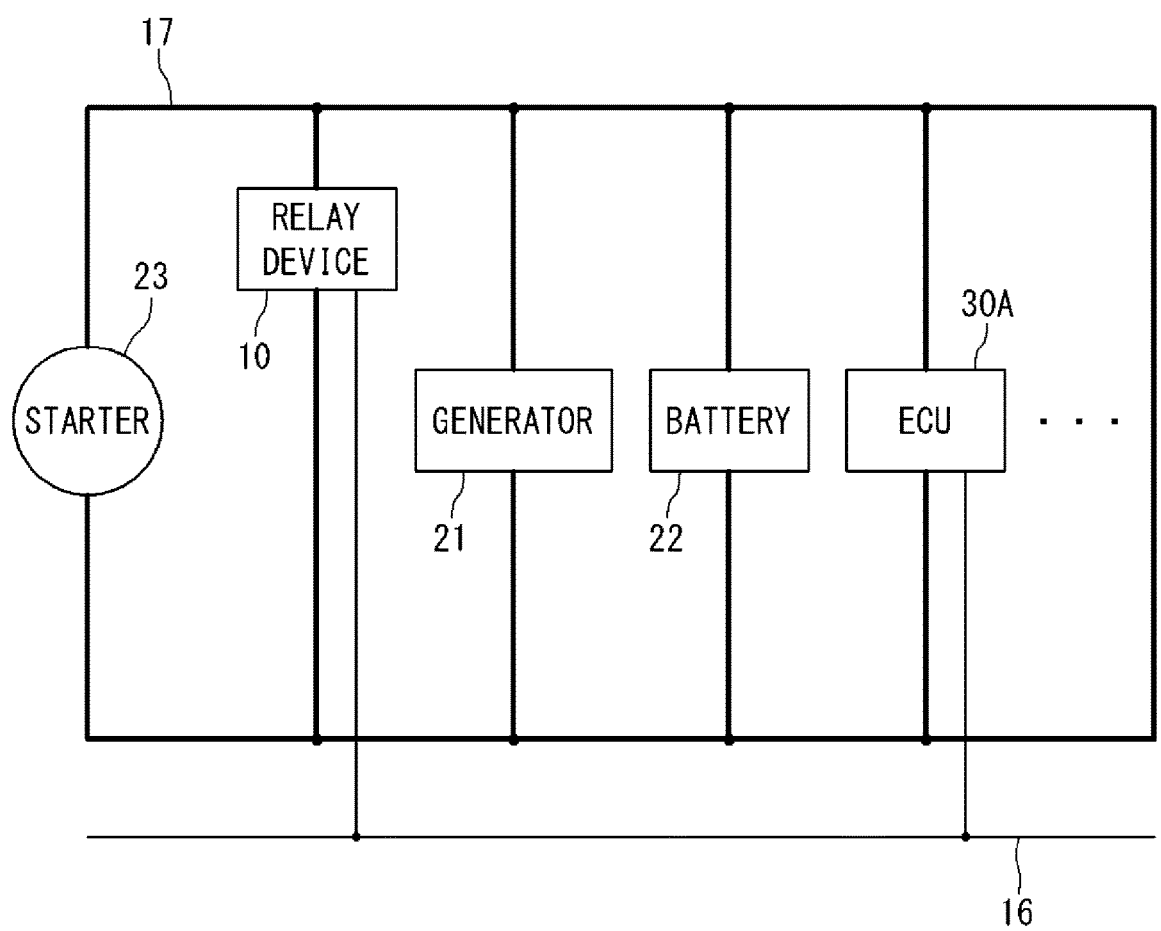
FIG. 2 is a schematic diagram showing an example of a power supply configuration of the vehicle.

FIG. 2 is a schematic diagram showing an example of a power supply configuration of the vehicle 1. In FIG. 2, a power line 17 is indicated by a thick line to be distinguished from the in-vehicle communication line 16. FIG. 2 shows, as an example, a power supply configuration in a case where the vehicle 1 is not a hybrid vehicle but a conventional vehicle that is called a gasoline vehicle. With reference to FIG. 2, the vehicle 1 includes a generator 21 and a battery 22 as power supplies. The generator 21 is a generator that generates power in accordance with driving of an engine. The generator 21 is an alternator, for example. The battery 22 is a general lead battery. The battery 22 may be a lithium ion battery, a nickel-metal hydride battery, or a combination thereof.

To the generator 21 and the battery 22, on-vehicle devices, such as the relay device 10, the ECU 30A, a plurality of other ECUs, and a starter 23, are connected via the power line 17. The generator 21 and the battery 22 are able to supply power to these on-vehicle devices via the power line 17. The power generated by the generator 21 may be supplied to the battery 22 via the power line 17, and stored in the battery 22.

[Configuration of Relay Device]

Figure 3:
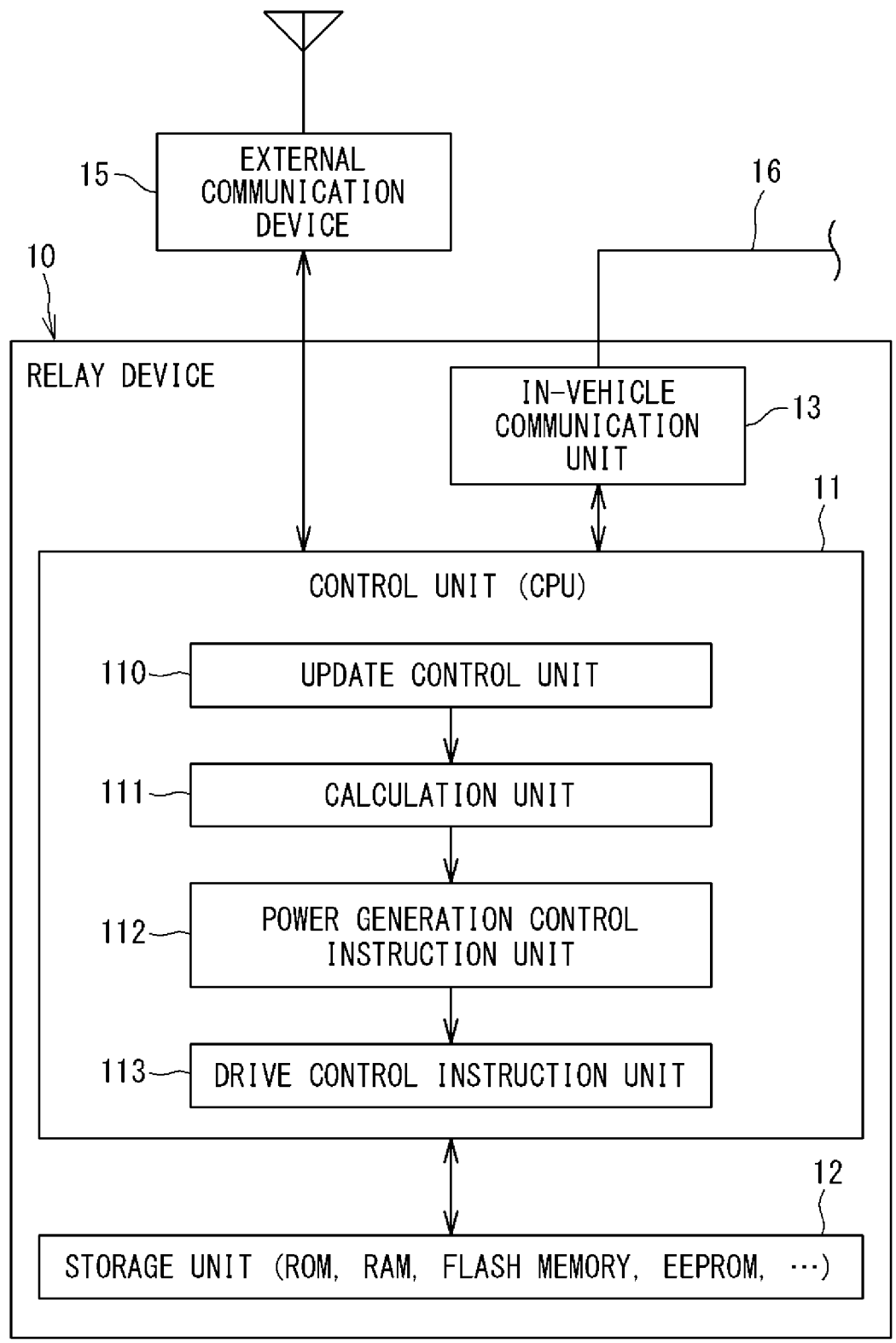
FIG. 3 is a block diagram showing an internal configuration of a relay device.

FIG. 3 is a block diagram showing an internal configuration of the relay device 10. With reference to FIG. 3, the relay device 10 includes a control unit 11, a storage unit 12, an in-vehicle communication unit 13, a sensor interface (I/F) 14, and the like.

The control unit 11 of the relay device 10 includes a CPU (Central Processing Unit). The CPU in the control unit 11 includes one or a plurality of large scale integrated circuits (LSI). In the CPU including a plurality of LSIs, the LSIs cooperate with each other to realize functions of the CPU.

The CPU in the control unit 11 has a function of executing various processes with one or a plurality of programs being read out from the storage unit 12. A computer program to be executed by the CPU in the control unit 11 can be transferred in a state of being recorded in a recording medium such as a CD-ROM or a DVD-ROM, or may be transferred by being downloaded from a computer device such as a server computer.

The storage unit 12 includes, for example, a nonvolatile memory element such as a flash memory or an EEPROM (Electrically Erasable Programmable Read Only Memory: "EEPROM" is a registered trademark). The storage unit 12 has a storage area in which programs to be executed by the CPU in the control unit 11, data required in executing the programs, and the like are stored.

The in-vehicle communication line 16 is connected to the in-vehicle communication unit 13. The in-vehicle communication unit 13 is a communication device that communicates with the ECU 30 in accordance with a predetermined communication standard such as CAN.

The in-vehicle communication unit 13 transmits information provided from the CPU in the control unit 11 to a predetermined ECU 30, and provides information transmitted from the ECU 30 to the CPU in the control unit 11.

The external communication device 15 is a wireless communication device including an antenna and a communication circuit that executes transmission/reception of a radio signal through the antenna. The external communication device 15 can communicate with the external device when being connected to a wide-area communication network such as a mobile phone network.

The external communication device 15 transmits information provided from the CPU in the control unit 11 to the external device such as a server via a wide-area communication network formed by a base station (not shown), and provides information received from the external device to the CPU in the control unit 11.

[Function of Relay Device]

The relay device 10 functions as a control device for controlling a control program update process in an ECU 30. That is, the relay device 10 receives an update program of the ECU 30 from an external device such as a server, and requests the ECU 30 that executes the update process (hereinafter referred to as "target ECU") to execute the update process, at a predetermined timing such as when the update program is received. In order to function as a control device for controlling the update process of the target ECU, the control unit 11 in the relay device 10 has an update control unit 110 (FIG. 3). This function is implemented mainly by the CPU in the control unit 11 when the CPU reads out one or a plurality of programs stored in the storage unit 12 and executes the program.

The update control unit 110 transfers the update program to the in-vehicle communication unit 13, and causes the in-vehicle communication unit 13 to transmit the update program to the target ECU. In addition, the update control unit 110 generates a control frame instructing the target ECU to execute the update process, transfers the control frame to the in-vehicle communication unit 13, and causes the in-vehicle communication unit 13 to transmit the control frame to the target ECU.

In the present embodiment, the relay device 10 further functions as a control device for executing charge control for the vehicle 1. The purpose of the charge control is to control power generation in the generator 21 such that a power storage amount of the battery 22 during traveling is a power amount within a prescribed range.

The charge control includes: a setting process of setting threshold values described later; and a power generation control process of controlling power generation in the generator 21 by an ECU 30C that controls the generator 21. In order to execute the charge control, the control unit 11 in the relay device 10 according to the first embodiment includes a calculation unit 111 which executes the setting process, and a power generation control instruction unit 112 which executes the power generation control process (FIG. 3). These functions are implemented mainly by the CPU in the control unit 11 when the CPU reads out one or a plurality of programs stored in the storage unit 12, and executes the program. Since a drive control instruction unit 113 shown in FIG. 3 will be described with respect to a subsequent embodiment later, it is not included in the control unit 11 of the first embodiment.

The setting process executed by the calculation unit 111 is a process of calculating threshold values as boundary values of the aforementioned prescribed range, and setting the calculated threshold values. Specifically, the calculation unit 111 stores therein an upper-limit value of the prescribed range in advance, and sets the value as an upper-limit threshold value. Furthermore, the calculation unit 111 receives, from the update control unit 110, information as to whether charge control is one in normal time or one considering a scheduled update, which will be described later, calculates a threshold value to be a lower-limit value of the prescribed range according to the information, and sets the threshold value as a lower-limit threshold value.

The power generation control process executed by the power generation control instruction unit 112 is a process of monitoring the power storage amount of the battery 22 during traveling, and controlling power generation in the generator 21 by the ECU 30C which controls the generator 21 such that the power storage amount is within the prescribed range defined by the threshold values calculated by the calculation unit 111. Specifically, the power generation control process is a process of instructing the ECU 30C to execute of power generation. When causing the generator 21 to generate power, the CPU in the control unit 11 generates a control frame including a command that instructs power generation in the generator 21, transfers the control frame to the in-vehicle communication unit 13, and causes the in-vehicle communication unit 13 to transmit the control frame to the ECU 30C that controls the generator 21. When causing the generator 21 to stop power generation, the CPU in the control unit 11 generates a control frame including a command that instructs stop of power generation in the generator 21, transfers the control frame to the in-vehicle communication unit 13, and causes the in-vehicle communication unit 13 to transmit the control frame to the ECU 30C that controls the generator 21.

The power generation control instruction unit 112 instructs the ECU 30C to cause the generator 21 to generate power until the power storage amount of the battery 22 reaches the upper-limit threshold value, during traveling of the vehicle 1. When the power storage amount of the battery 22 has reached the upper-limit threshold value, the power generation control instruction unit 112 instructs the ECU 30C to stop the power generation in the generator 21. When the power storage amount of the battery 22 is reduced to reach the lower-limit threshold value because the generator 21 is not performing power generation, the power generation control instruction unit 112 instructs the ECU 30C to cause the generator 21 to generate power.

(1. Charge Control in Normal Time)

Figure 4:
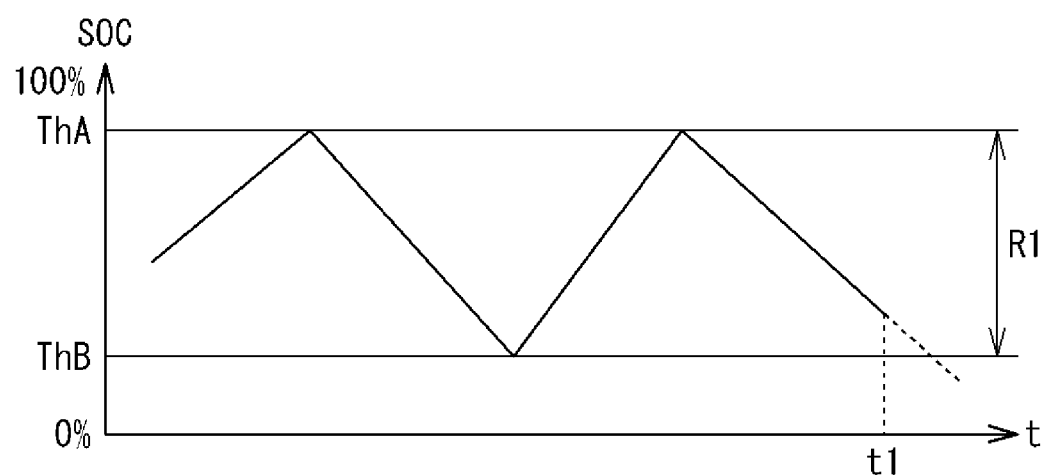
FIG. 4 is a diagram for explaining charge control in normal time during traveling.

FIG. 4 is a diagram for explaining charge control in normal time during traveling, and shows changes in the power storage amount of the battery 22 with time. Here, "normal time during traveling" indicates a state during traveling in which an update process is not scheduled to be performed in the target ECU during a stop of the vehicle 1 immediately after the traveling. The power storage amount of the battery 22 is represented by a state of charge (SOC) which is a ratio of the amount of stored power to the full charge capacity, for example.

In normal time, the calculation unit 111 sets a threshold value ThA stored in advance as an upper-limit value, and a threshold value ThB stored in advance as a lower-limit value. The threshold value ThB is a value corresponding to an amount of power less than the threshold value ThA, and corresponding to an amount of power required for start of the vehicle 1. The amount of power required for start of the vehicle 1 is, for example, an amount of power required for activating the starter 23.

The power generation control instruction unit 112 instructs the ECU 30C to cause the generator 21 to generate power until the power storage amount of the battery 22 during traveling reaches the threshold value ThA. When the power storage amount of the battery 22 has reached the threshold value ThA, the power generation control instruction unit 112 instructs the ECU 30C to stop the power generation in the generator 21. Since the power stored in the battery 22 is used for the traveling operation of the vehicle 1, if the generator 21 does not generate power, the power storage amount of the battery 22 is decreased. When the power storage amount of the battery 22 during traveling is reduced to reach the threshold value ThB because power generation in the generator 21 is stopped, the power generation control instruction unit 112 instructs the ECU 30C to cause the generator 21 to generate power.

Thus, in normal time, the power storage amount of the battery 22 during traveling is maintained within the range R1 defined by the upper-limit threshold value ThA and the lower-limit threshold value ThB.

When the charge control in normal time shown in FIG. 4 has been performed and the vehicle 1 is stopped immediately after the traveling in normal time, the minimum power storage amount of the battery 22 during the stop of the vehicle 1 is the power amount corresponding to the threshold value ThB. For example, it is assumed that the vehicle 1 is stopped at time t1 (FIG. 4) when power generation in the generator 21 is stopped. If the update process is executed in this state, i.e., during the stop of the vehicle 1, the power storage amount of the battery 22 is decreased and becomes smaller than the threshold value ThB as indicated by a dotted line on and after time t1 in FIG. 4. As a result, an amount of power required for start of the vehicle 1 after the stop becomes insufficient, which may prevent the vehicle 1 from starting. Therefore, the relay device 10 according to the present embodiment executes charge control considering scheduled update, in addition to the charge control in normal time.

(2. Charge Control Considering Scheduled Update)

Figure 5:
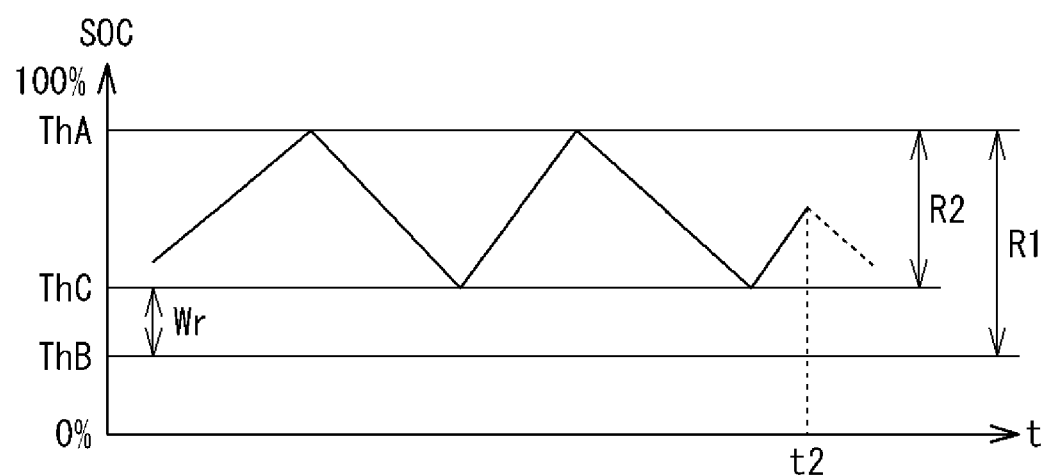
FIG. 5 is a diagram for explaining charge control considering scheduled update, during traveling.

FIG. 5 is a diagram for explaining charge control considering scheduled update during traveling, and shows changes in the power storage amount of the battery 22 with time. Here, "considering scheduled update during traveling" indicates a state during traveling in which an update process is scheduled to be performed in a target ECU during a stop of the vehicle 1 immediately after the traveling.

With an update process being scheduled, the calculation unit 111 sets a threshold value ThA stored in advance as an upper-limit value. Meanwhile, the calculation unit 111 calculates a threshold value ThC by use of an amount of power necessary for the update process (hereinafter referred to as "necessary power amount") Wr, and sets the threshold value ThC as a lower-limit value. The threshold value ThC is a value corresponding to an amount of power less than the threshold value ThA, and corresponding to a greater amount of power than the necessary power amount Wr. Preferably, the threshold value ThC is a value equal to or greater than a value obtained by adding the necessary power amount Wr to the threshold value ThB corresponding to the amount of power necessary for start of the vehicle 1.

The threshold value ThC is a value obtained by adding the necessary power amount Wr to the threshold value ThB (ThC=ThB+Wr), for example. Thereby, through the subsequent charge control, at least the necessary power amount and the amount of power necessary for start of the vehicle 1 are stored in the battery 22 when the vehicle 1 is stopped, whereby the amount of power necessary for the update process during the stop of the vehicle 1 and for start of the vehicle 1 after the stop is ensured. As a result, both the update process during the stop of the vehicle 1 and the start of the vehicle 1 after the stop can be realized.

In another example, the threshold value ThC is a value obtained by adding the necessary power amount Wr and a margin α to the threshold value ThB (ThC=ThB+Wr+α). The margin α is a positive value. Thus, through the subsequent charge control, an amount of power greater than the sum of the necessary power amount and the amount of power necessary for start of the vehicle 1 is stored in the battery 22 when the vehicle 1 is stopped, whereby an amount of power corresponding to the margin α is ensured in addition to the amount of power necessary for the update process during the stop of the vehicle 1 and for the start of the vehicle 1 after the stop. As a result, even when there is unexpected power consumption other than the update process, both the update process during the stop of the vehicle 1 and the start of the vehicle 1 after the stop can be realized.

The power generation control instruction unit 112 instructs the ECU 30C to cause the generator 21 to generate power until the power storage amount of the battery 22 during traveling reaches the threshold value ThA. When the power storage amount of the battery 22 has reached the threshold value ThA, the power generation control instruction unit 112 instructs the ECU 30C to stop the power generation in the generator 21. Since the power stored in the battery 22 is used for the traveling operation of the vehicle 1, if the generator 21 does not generate power, the power storage amount of the battery 22 is decreased. When the power storage amount of the battery 22 during traveling is reduced to reach the threshold value ThC because power generation in the generator 21 is stopped, the power generation control instruction unit 112 instructs the ECU 30C to cause the generator 21 to generate power.

Thus, considering scheduled update, the power storage amount of the battery 22 during traveling is maintained within a range R2 defined by the upper-limit threshold value ThA and the lower-limit threshold value ThC. The range R2 has a lower-limit value greater than that of the range R1, and is narrower than the range R1.

When the charge control for scheduled update shown in FIG. 5 has been executed and the vehicle 1 is stopped immediately after the traveling considering scheduled update, the minimum power storage amount of the battery 22 when the vehicle 1 is stopped is an amount of power corresponding to the threshold value ThC. For example, it is assumed that the vehicle 1 is stopped at time t2 in FIG. 5 when power generation in the generator 21 is stopped. If the update process is executed in this state, i.e., during the stop of the vehicle 1, the power storage amount of the battery 22 is decreased as indicated by a dotted line on and after time t2 in FIG. 5. However, since the power storage amount of the battery 22 at time t2 is equal to or greater than the threshold value ThC, even if the update process is executed and the necessary power amount Wr is decreased, the amount of power corresponding to the threshold value ThB necessary for start of the vehicle 1 is stored in the battery 22. Therefore, even when the update process is executed during the stop of the vehicle 1, the amount of power necessary for start of the vehicle 1 is stored in the battery 22.

[Charge Control Process]

Figure 6:
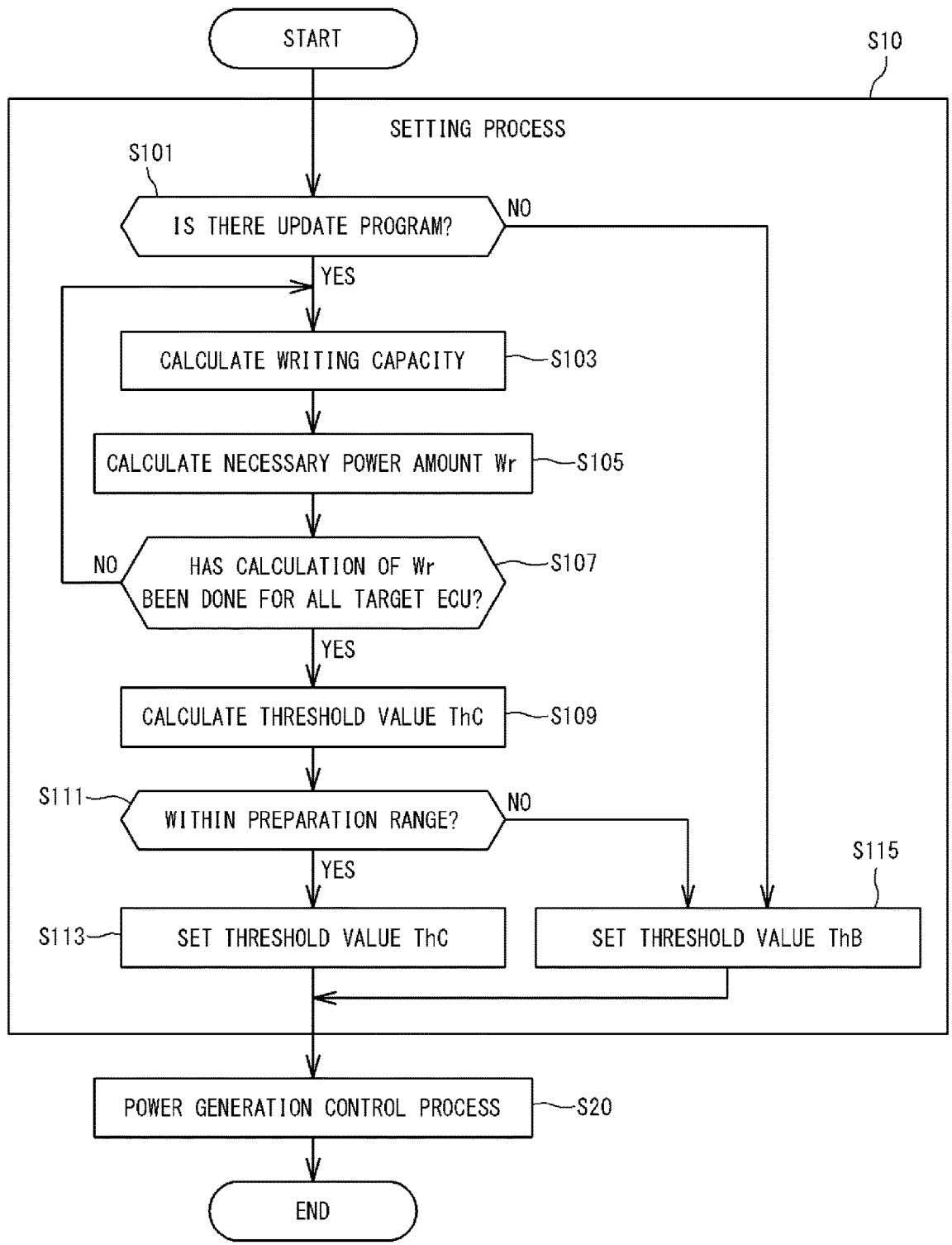
FIG. 6 is a flowchart showing a flow of a charge control process.

FIG. 6 is a flowchart showing a flow of a charge control process executed by the entire communication network 4. The charge control process shown in the flowchart of FIG. 6 is executed by the control unit 11 in the relay device 10 which reads out and executes a program stored in the storage unit 12, and by the ECU 30C that complies with commands from the control unit 11. The control unit 11 in the relay device 10 starts the process shown in FIG. 6 at a predetermined timing while the vehicle 1 is traveling. The predetermined timing is, for example, a regular interval, a time when a prescribed operation is performed, or the like. Since step S111 in FIG. 6 is a step to be executed in a second embodiment, it is not included in the charge control process of the first embodiment.

With reference to FIG. 6, the control unit 11 in the relay device 10 executes a setting process (step S10) to set threshold values. Thereafter, the control unit 11 instructs the ECU 30C to execute a power generation control process (step S20) for making the power storage amount of the battery 22 be within a range defined by the threshold values set in step S10.

In the setting process in step S10, the control unit 11 checks whether or not there is an update program received from an external device such as a server. When there is an update program (YES in step S101), the control unit 11 executes charge control considering scheduled update. That is, the control unit 11 sets, as an upper-limit value, a threshold value ThA stored in advance, and calculates a threshold value ThC by using a necessary power amount Wr and sets the threshold value ThC as a lower-limit value.

In order to obtain the necessary power amount Wr, the control unit 11 calculates, for example, a writing capacity C [byte] in a target ECU, based on the size of the update program (step S103). Next, the control unit 11 calculates a necessary power amount Wr [Wh] for executing an update process in the target ECU (step S105). In step S105, specifically, the control unit 11 calculates a time t [h] required for writing in the target ECU by multiplying the writing capacity C of the target ECU by writing performance that is a time required for writing per unit capacity in the target ECU. Then, the control unit 11 calculates the necessary power amount Wr [Wh] by multiplying the time t by a power consumption y [W] per unit time of the target ECU, which is stored in advance. When there are a plurality of target ECUs, the control unit 11 calculates a necessary power amount Wr which is a sum of necessary power amounts of the respective target ECUs (YES in step S107).

The control unit 11 calculates a threshold value ThC by using the necessary power amount Wr (step S109). In step S109, for example, the control unit 11 calculates the threshold value ThC by adding the necessary power amount Wr to a threshold value ThB corresponding to an amount of power stored in advance as an amount of power necessary for start of the vehicle 1 (ThC=ThB+Wr), and sets the threshold value ThC as a lower-limit value (step S113).

When there is no update program (NO in step S101), the control unit 11 executes charge control in normal time. That is, the control unit 11 sets, as an upper-limit value, the threshold value ThA stored in advance, and sets, as a lower-limit value, the threshold value ThB, stored in advance, corresponding to the amount of power necessary for start of the vehicle 1 (step S115).

Figure 7:
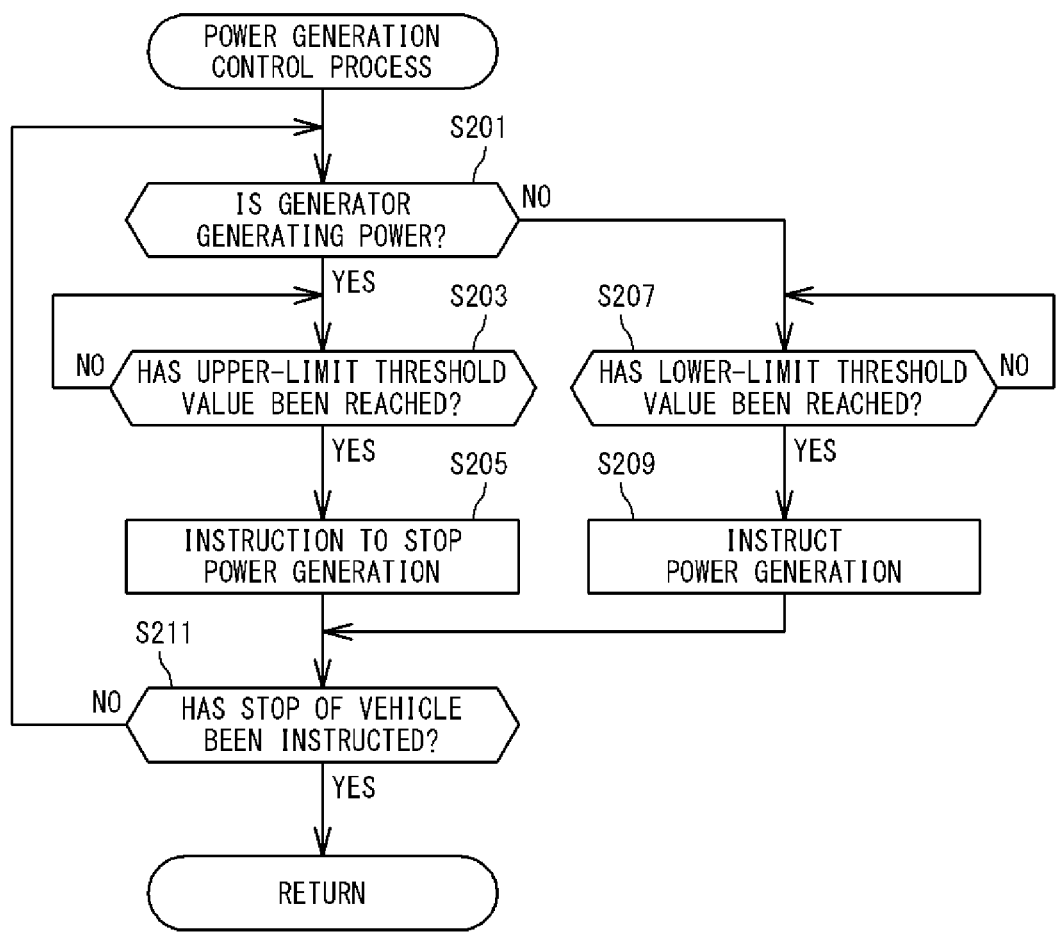
FIG. 7 is a flowchart showing an example of a flow of a power generation control process in step S20 shown in FIG. 6.

FIG. 7 is a flowchart showing a flow of the power generation control process in step S20. With reference to FIG. 7, the control unit 11 branches the process according to the state of the generator 21 as to whether or not the generator 21 is generating power, which is determined based on a transmission frame from the ECU 30C that controls the generator 21. That is, when the generator 21 is generating power (YES in step S201), the control unit 11 determines whether or not a charge amount of the battery 22, obtained from the transmission frame from the ECU 30B that controls the battery 22, reaches an upper-limit threshold value. When the charge amount of the battery 22 reaches the upper-limit threshold value (YES in step S203), the control unit 11 instructs the ECU 30C to stop the power generation in the generator 21 (step S205). According to this instruction, the ECU 30C controls the generator 21 to stop the power generation. Otherwise, the control unit 11 does not perform the instruction. Thus, the power generating state is maintained.

While the power generation in the generator 21 is stopped (NO in step S201), the control unit 11 determines whether or not the charge amount of the battery 22 obtained from the transmission frame from the ECU 30B reaches a lower-limit threshold value. The lower-limit threshold value is the threshold value ThB when charge control in normal time is executed, and the threshold value ThC when charge control considering scheduled update is executed. When the charge amount of the battery 22 reaches the lower-limit threshold value (YES in step S207), the control unit 11 instructs the ECU 30C to cause the generator 21 to generate power (step S209). According to this instruction, the ECU 30C controls the generator 21 to start power generation. Otherwise, the control unit 11 does not perform the instruction. Thus, the power generation stop state is maintained.

The above-described process is repeated until execution of an instruction to stop the vehicle 1 is detected (NO in step S211). When the vehicle 1 is stopped, the control unit 11 returns to the process shown in FIG. 6 to end the series of process steps (YES in step S211).

Effect of First Embodiment

Since the above-described charge control is executed by the control unit 11 in the relay device 10 functioning as a control device, the power storage amount of the battery 22 changes as shown in FIG. 4 during traveling in normal time when an update process is not scheduled to be performed during the stop of the vehicle 1 after the traveling, and is maintained within the range R1 between the threshold value ThA and the threshold value ThB. Thus, the vehicle 1 is stopped in the state where at least the amount of power corresponding to the threshold value ThB, that is, the amount of power necessary for start of the vehicle 1, is stored in the battery 22. Therefore, it is possible to avoid a situation that the vehicle 1 cannot be started due to power shortage at the next start, while reducing the operation (power generation) time of the generator 21 to reduce fuel consumption.

Meanwhile, in the case where an update process is scheduled to be performed during the stop of the vehicle 1 after traveling, the power storage amount of the battery 22 changes as shown in FIG. 5 during traveling, and is maintained within the range R2 between the threshold value ThA and the threshold value ThC. Thus, the vehicle 1 is stopped while at least the amount of power equal to or greater than the sum of the amount of power necessary for start of the vehicle 1 and the necessary power amount is stored in the battery 22. Therefore, the update process can be executed during the stop of the vehicle 1, and it is possible to avoid a situation that the vehicle 1 cannot be started due to power shortage at the next start.

Second Embodiment

In the charge control considering scheduled update, the lower-limit threshold value is greater by the necessary power amount as compared to the charge control in normal time. That is, since more amount of power is stored and maintained as a whole in the battery 22 as compared to the charge control in normal time, the operation (power generation) time of the generator 21 is increased. As a result, the effect of reducing fuel consumption is degraded as compared to the charge control in normal time. Therefore, the control unit 11 in the relay device 10 functioning as a control device in the second embodiment limits a period during which charge control considering scheduled update is executed.

The charge control considering scheduled update is performed for the purpose of ensuring a necessary power amount to be stored in the battery 22 during the stop of the vehicle 1 when the update process is executed. Therefore, this charge control only has to be executed during traveling immediately before the stop of the vehicle 1. Therefore, the control unit 11 in the relay device 10 according to the second embodiment determines, as a preparation range, a distance from a position by a predetermined distance before a scheduled stop position to the scheduled stop position, and executes the charge control considering scheduled update within the preparation range.

The scheduled stop position is a destination, for example. In this case, the control unit 11 can obtain the scheduled stop position by obtaining information indicating the destination from a car navigation system (not shown) or an ECU controlling a car navigation system, for example. In another example, the control unit 11 may estimate a behavior pattern of the vehicle 1 based on a behavior history of the vehicle 1 stored in a server (not shown) or the like, and read out the destination from the estimated behavior pattern.

As for the behavior pattern estimation method, any well-known method may be adopted. When the scheduled stop position is a destination, the preparation range is a range from the destination and a point by a prescribed distance before the destination.

In another example, the scheduled stop position may be a scheduled stop time. In this case, as in the case where the scheduled stop position is a destination, the control unit 11 may obtain the scheduled stop time from a car navigation system, or may read out the scheduled stop time from the behavior pattern estimated based on the behavior history of the vehicle 1. In the case where the scheduled stop position is a scheduled stop time, the preparation range is a period from a time by a prescribed period before the scheduled stop time to the scheduled stop time.

Preferably, the control unit 11 determines the preparation range, based on the necessary power amount Wr. That is, the control unit 11 determines the prescribed distance or the prescribed period, based on the necessary power amount Wr. In this case, the control unit 11 stores therein correspondence between the necessary power amounts Wr and the prescribed distance or the prescribed period, and specifies the prescribed distance by applying the correspondence to the calculated necessary power amount Wr.

The charge control process executed by the control unit 11 in the relay device 10 according to the second embodiment is a process including step S111 of the flowchart shown in FIG. 6. That is, with reference to FIG. 6, in the present embodiment, when there is an update program in the setting process (YES in step S10), the control unit 11 further determines whether or not the current position is within the preparation range. The current position can be obtained from a car navigation system (not shown) or an ECU controlling the car navigation system.

When the current position has not yet reached the preparation range (NO in step S111), the control unit 11, even if there is an update program, does not set the threshold value ThC as a lower-limit threshold value but sets the threshold value ThB stored in advance, as a lower-limit threshold value (step S115). In this case, not the charge control considering scheduled update but the charge control in normal time is executed.

When the current position has reached the preparation range (YES in step S111), the control unit 11 sets the threshold value ThC calculated in step S109, as a lower-limit threshold value (step S113). Then, the control unit 11 starts the charge control considering scheduled update in step S20.

Effect of Second Embodiment

Since the above-described charge control is executed by the control unit 11 in the relay device 10 according to the second embodiment, even when an update process is scheduled to be performed during the stop of the vehicle 1, the period of the charge control can be reduced by making start of the charge control considering scheduled update close to the scheduled stop position. Thus, both reduction in fuel consumption and execution of the update process during the stop of the vehicle 1 can be achieved.

Furthermore, since the preparation range is determined based on the necessary power amount, it is possible to set an optimum preparation range according to the necessary power amount. That is, the preparation range can be further reduced. Thus, fuel consumption can be further reduced.

Third Embodiment

If the distance from the start position of the charge control considering scheduled update to the scheduled stop position, i.e., the control period, is short, the power storage amount of the battery 22 sometimes does not reach the threshold value ThC within the distance. In this case, the amount of power corresponding to the threshold value ThC is not charged in the battery 22 before the vehicle 1 is stopped. Therefore, the control unit 11 in the relay device 10 functioning as a control device according to the third embodiment further executes charge control based on the length of the control period.

The charge control process according to the third embodiment further includes a drive control process of controlling the rotation speed of an engine (not shown) by an ECU that controls the engine. Therefore, the control unit 11 further includes a drive control instruction unit 113 for executing the drive control process (FIG. 3). The drive control process includes control for increasing the rotation speed of the engine, and control for restoring the increased rotation speed. When the rotation speed of the engine is changed, the drive control instruction unit 113 generates a control frame including a command that instructs change of the rotation speed, transfers the control frame to the in-vehicle communication unit 13, and causes the in-vehicle communication unit 13 to transmit the control frame to the ECU that controls the engine.

When the control unit 11 starts the power generation control process in step S20 of the flowchart shown in FIG. 6 with the threshold value ThC being set as a lower-limit threshold value in step S113, the control unit 11 further determines whether or not the length of the control period is sufficient. For example, the control unit 11 determines whether or not the length of the control period is equal to or longer than a period necessary for generating the necessary power amount Wr (period necessary for power generation). The reason is as follows. Under the charge control in normal time, the lower-limit value of the power storage amount of the battery 22 is the amount of power corresponding to the threshold value ThB. Therefore, in order to make the power storage amount of the battery 22 at the scheduled stop position equal to or greater than the threshold value ThC (=ThB+Wr), an amount of power equal to or greater than the necessary power amount Wr needs to be stored in the battery 22 during the control period.

If the length of the control period is shorter than the period necessary for power generation, the control unit 11 instructs the ECU that controls the engine (not shown) to perform control for increasing the rotation speed of the engine, in the power generation control process started in step S30. If the length of the control period is longer than the period necessary for power generation, the control unit 11 does not perform the above instruction.

Effect of Third Embodiment

Since the above-described charge control is executed by the control unit 11 in the relay device 10 according to the third embodiment, even if the control period is shorter than the period necessary for power generation, that is, even if the start position of the charge control considering scheduled update is excessively close to the scheduled stop position, at the time of starting the charge control considering scheduled update, it is possible to ensure that the amount of power corresponding to the threshold value ThC is stored in the battery 22 during the stop of the vehicle 1.

Fourth Embodiment

Preferably, an ECU that controls an on-vehicle air conditioner (not shown) includes a thermometer for measuring the ambient temperature around the vehicle 1, and the relay device 10 obtains the measured ambient temperature from the ECU. In the setting process in step S10, the control unit 11 in the relay device 10 corrects the threshold values ThA, ThB and/or ThC, based on the obtained ambient temperature. Therefore, the control unit 11 stores in advance the corresponding relationship between the ambient temperature and the corrected value, and determines the threshold values based on the ambient temperature.

Generally, the higher the ambient temperature is, the easier the entire vehicle 1 is heated and the easier the temperature of the battery 22 itself increases. The higher the temperature of the battery 22 is, the more the fuel consumption is reduced. Since the threshold values are set based on the ambient temperature, both reduction in fuel consumption and execution of the update process during the stop of the vehicle 1 can be achieved.

Fifth Embodiment

The control device is not limited to the relay device 10, and may be an ECU other than the relay device 10. Alternatively, the control device may be a dedicated device independent from the relay device 10. Still alternatively, the control device may be implemented by cooperation of a plurality of devices, i.e., a device executing the setting process in step S10 and a device executing the power generation control process in step S20.

As an example, the ECU 30C for controlling the generator 21 may execute the power generation control process in step S20 shown in FIG. 6, upon receiving the threshold values (the upper-limit threshold value, the lower-limit threshold value, the threshold value ThB, the threshold value ThC, etc.) calculated by the calculation unit 111 through the power generation control process executed by the power generation control instruction unit 112 of the control unit 11 in the relay device 10. That is, the ECU 30C sets the threshold values according to an instruction from the relay device 10. Then, the CPU 30C compares the power storage amount of the battery 22 during traveling with the set threshold values, and controls start/stop of power generation in the generator 21 according to the comparison result.

The disclosed feature is implemented by one or more modules. For example, the feature can be implemented by: hardware modules such as circuit elements; software modules defining processes that realize the feature; or a combination of the hardware modules and the software modules.

The disclosed feature may be provided as a program, which is a combination of one or more software modules, for causing a computer to execute the aforementioned operations. Such a program may be recorded in a computer-readable recording medium, such as a flexible disc, a CD-ROM (Compact Disk-Read Only Memory), a ROM, a RAM, or a memory card adjunct to the computer, to be provided as a program product. Alternatively, the program may be provided by being recorded in a recording medium such as a hard disk incorporated in the computer. The program may also be provided by being downloaded via a network.

The program according to the present disclosure may call up necessary modules in a predetermined array at a predetermined timing from among program modules provided as a part of an operating system (OS) of a computer, and may cause the computer to execute processing. In this case, the modules are not included in the program itself, and the processing is executed in cooperation with the OS. The program according to the present disclosure also includes such a program including no modules.

The program according to the present disclosure may be provided by being incorporated in a part of another program. In this case as well, modules included in the other program are not included in the program itself, and processing is executed in cooperation with the other program. The program according to the present disclosure also includes such a program incorporated in another program. A program product to be provided is installed in a program storage unit such as a hard disk, and executed. The program product includes the program itself and a recording medium in which the program is recorded.

The above embodiments are merely illustrative in all aspects and should not be recognized as being restrictive. The scope of the present disclosure is defined by the scope of the claims rather than by the description above, and is intended to include meaning equivalent to the scope of the claims and all modifications within the scope.

REFERENCE SIGNS LIST 1 vehicle
4 communication network
10 relay device
11 control unit
12 storage unit
13 in-vehicle communication unit
15 external communication device
16 in-vehicle communication line
17 power line
21 generator
22 battery
23 starter
30, 30A, 30B, 30C ECU
110 update control unit
111 calculation unit
112 power generation control instruction unit
113 drive control instruction unit

The invention claimed is:
1. A control device comprising:
an in-vehicle communication unit capable of communicating with an on-vehicle control device; and
a control unit configured to control the in-vehicle communication unit, wherein the control unit monitors a power storage amount of an on-vehicle battery during vehicle traveling, and executes a charge control for causing the in-vehicle communication unit to transmit an instruction of power generation to an on-vehicle generator that supplies power to the on-vehicle battery, when the power storage amount is reduced to reach a threshold value regarding a power amount, and
the control unit determines a prescribed distance or a prescribed period for charging, in the on-vehicle battery, a necessary power amount required for an update process of a control program in the on-vehicle control device,
the control unit determines whether a preparation range that starts by the prescribed distance or the prescribed period before a scheduled stop of a vehicle includes a current position or a current time of the vehicle, in response to determining that the preparation range does not include the current position or the current time of the vehicle, the control unit sets a first threshold value for vehicle traveling, and executes the charge control, and in response to determining that the preparation range includes the current position or the current time of the vehicle, the control unit sets a second threshold value different from the first threshold value for an update of the control program, and executes the charge control.

2. The control device according to claim 1, wherein the control unit calculates the second threshold value, based on the necessary power amount.

3. The control device according to claim 2, wherein the control unit calculates the second threshold value by adding the necessary power amount to a lower-limit value of the power storage amount.

4. The control device according to claim 3, wherein the control unit calculates the second threshold value by adding the necessary power amount and a prescribed margin to the lower-limit value of the power storage amount.

5. The control device according to claim 1, wherein
the on-vehicle generator generates power with rotation of an engine, and
the control unit causes the in-vehicle communication unit to transmit an instruction to change a rotation speed of the engine, based on a period from start of the charge control to stop of the vehicle, and on the necessary power amount.

6. A control device comprising:
an in-vehicle communication unit capable of communicating with an on-vehicle control device; and
a control unit configured to control the in-vehicle communication unit, wherein:
the control unit monitors a power storage amount of an on-vehicle battery during traveling, and executes a charge control for causing the in-vehicle communication unit to transmit an instruction of power generation to an on-vehicle generator that supplies power to the on-vehicle battery, when the power storage amount is reduced to reach a threshold value, the threshold value corresponding to a power amount greater than a necessary power amount required for an update process of a control program in the on-vehicle control device,
the control unit executes the charge control within a preparation range that starts by a predetermined amount, in distance or time, before a scheduled stop of a vehicle,
the control unit calculates the threshold value, based on the necessary power amount, and
the control unit corrects the calculated threshold value, based on an ambient temperature.

7. A control device comprising:
an in-vehicle communication unit capable of communicating with an on-vehicle control device; and
a control unit configured to control the in-vehicle communication unit, wherein:
the control unit monitors a power storage amount of an on-vehicle battery during traveling, and executes a charge control for causing the in-vehicle communication unit to transmit an instruction of power generation to an on-vehicle generator that supplies power to the on-vehicle battery, when the power storage amount is reduced to reach a threshold value, the threshold value corresponding to a power amount greater than a necessary power amount required for an update process of a control program in the on-vehicle control device,
the control unit executes the charge control within a preparation range that starts by a predetermined amount, in distance or time, before a scheduled stop of a vehicle, and
the preparation range is a distance range between a scheduled stop position and a position by a predetermined distance before the scheduled stop position in a direction opposite to an advancing direction of the vehicle.

8. The control device according to claim 7, wherein the control unit determines the predetermined distance, based on the necessary power amount.

9. A method for controlling power generation of an on-vehicle generator, comprising the steps of:
determining a prescribed distance or a prescribed period for charging, in an on-vehicle battery, a necessary power amount required for an update process of a control program in an on-vehicle control device;
determining whether a preparation range that starts by the prescribed distance or the prescribed period before a scheduled stop of a vehicle includes a current position or a current time of the vehicle;
in response to determining that the preparation range does not include the current position or the current time of the vehicle, setting a first threshold value for vehicle traveling;
in response to determining that the preparation range includes the current position or the current time of the vehicle, setting a second threshold value different from the first threshold value for an update of the control program; and
monitoring a power storage amount of the on-vehicle battery during vehicle traveling, and when the power storage amount is reduced to reach the first threshold value or the second threshold, instructing the on-vehicle generator, which supplies power to the on-vehicle battery, to generate power.

10. A non-transitory computer readable storage medium storing a computer program for causing a computer to function as a control device that controls power generation of an on-vehicle generator,
the control device including a communication unit capable of communicating with an on-vehicle control device,
the computer program causing the computer to function as a control unit configured to monitor a power storage amount of an on-vehicle battery during vehicle traveling, and execute a charge control for causing the communication unit to transmit an instruction of power generation to an on-vehicle generator that supplies power to the on-vehicle battery, when the power storage amount is reduced to reach a threshold value regarding a power amount, wherein:
the control unit determines a prescribed distance or a prescribed period for charging, in the on-vehicle battery, a necessary power amount required for an update process of a control program in the on-vehicle control device,
the control unit determines whether a preparation range that starts by the prescribed distance or the prescribed period before a scheduled stop of a vehicle includes a current position or a current time of the vehicle,
in response to determining that the preparation range does not include the current position or the current time of the vehicle, the control unit sets a first threshold value for vehicle traveling, and executes the charge control, and in response to determining that the preparation range includes the current position or the current time of the vehicle, the control unit sets a second threshold value different from the first threshold value for an update of the control program, and executes the charge control.

11. A control device comprising:

an in-vehicle communication unit capable of communicating with an on-vehicle control device; and a control unit configured to control the in-vehicle communication unit, wherein:

the control unit monitors a power storage amount of an on-vehicle battery during traveling, and executes a charge control for causing the in-vehicle communication unit to transmit an instruction of power generation to an on-vehicle generator that supplies power to the on-vehicle battery, when the power storage amount is reduced to reach a threshold value, the threshold value corresponding to a power amount greater than a necessary power amount required for an update process of a control program in the on-vehicle control device, the control unit executes the charge control within a preparation range that starts by a predetermined amount, in distance or time, before a scheduled stop of a vehicle, and the preparation range is a time range between a scheduled stop time and a time by a predetermined time before the scheduled stop time.

\* \* \* \* \*